Figure 1:
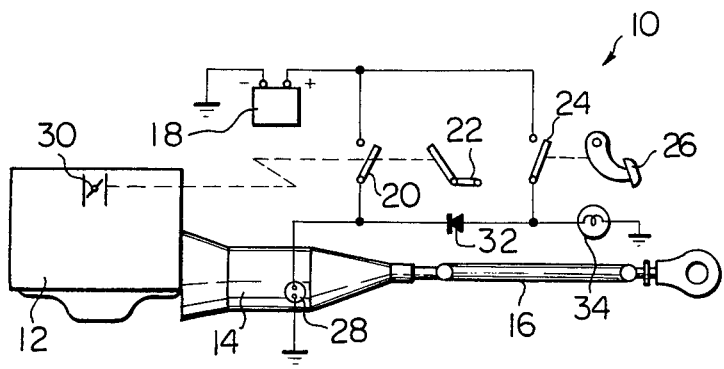

United States Patent [19]

Iijima

[11] 4,103,764
[45] Aug. 1, 1978

[54] CONTROL SYSTEM FOR AN AUTOMATIC POWER TRANSMISSION

[75] Inventor: Tetsuya Iijima, Tokyo, Japan

[73] Assignee: Nissan Motor Company, Ltd., Japan

[21] Appl. No.: 740,712

[22] Filed: Nov. 10, 1976

[30] Foreign Application Priority Data

Nov. 12, 1975 [JP] Japan .................. 50-135024

[51] Int. Cl.² ............................................ B60K 21/00
[52] U.S. Cl. .................... 192/4 A; 192/13 R; 74/865; 74/866; 74/867
[58] Field of Search .............. 192/4 A, 13 R, 4 R; 74/864, 865, 867, 866

[56] References Cited

U.S. PATENT DOCUMENTS

| | | | |
|---|---|---|---|
| 2,872,000 | 2/1959 | Herndon et al. | 192/4 A |
| 3,001,415 | 9/1961 | Smirl | 192/4 A |
| 3,523,597 | 8/1970 | Lemieux | 192/4 A |
| 3,667,579 | 6/1972 | Vizza | 192/4 A |
| 3,733,930 | 5/1973 | Mizote | 74/866 |
| 3,752,275 | 8/1973 | Mueller | 192/4 A |
| 3,859,873 | 1/1975 | Miyauchi et al. | 74/867 |
| 3,974,720 | 8/1976 | Iijima | 192/4 A |
| 4,008,630 | 2/1977 | Murakami et al. | 74/865 |

*Primary Examiner*—John J. Camby
*Assistant Examiner*—Henry C. Yuen

[57] ABSTRACT

When once the brake pedal is depressed, downshift shifting points at which the automatic power transmission takes a downshift to the next lower speed gear ratio are moved toward the higher vehicle speed side to readily achieve the downshift even during a relatively high speed vehicle driving.

8 Claims, 4 Drawing Figures

CONTROL SYSTEM FOR AN AUTOMATIC POWER TRANSMISSION

The present invention relates in general to an automatic power transmission of a motor vehicle and more particularly to a control system used for allowing the transmission to downshift to the next lower speed gear ratio to cause so-called engine braking once the brake pedal is depressed by the driver during cruising of the vehicle.

As is well known in the art, a conventional automatic power transmission is arranged so that when the engine throttle valve is partially open, the transmission control system will function to change the gear ratio, i.e. from low speed gear ratio to high speed gear ratio, at a relatively low vehicle speed, conversely, if the throttle valve is wide open, then the transmission control system functions to change the gear ratio at a substantially higher vehicle speed. This means that the downshift operation of the automatic power transmission causing engine braking occurs when the speed of the vehicle is reduced to a relatively low level. Thus, when the vehicle driver wants to decelerate the vehicle with the aid of the engine braking during relatively high speed cruising, he must handle the shift lever of the transmission to manually change the gear ratio to the next lower speed gear ratio.

Up to now, several improvements have been made in the automatic power transmission in order to achieve the engine braking function at a relatively high speed cruising of the vehicle without the above-mentioned complicated hand operation by the vehicle driver. However, these have not brought about big benefits and advantages to the vehicle driver with respect to the operation of the automatic power transmission.

Therefore, the present invention is proposed to eliminate the drawbacks encountered in the conventional automatic power transmission of a motor vehicle.

It is an object of the present invention to provide an automatic power transmission control system which can move the downshift shifting points of the transmission proper toward a higher vehicle speed side to readily effect a downshift to the next lower speed gear ratio causing engine braking when once the brake pedal of the vehicle is depressed by the vehicle driver.

It is another object of the present invention to provide an automatic power transmission control system which can allow the transmission proper to remain in the above-mentioned next lower speed gear ratio even when the brake pedal is released as long as the magnitude of the throttle pressure substantially proportional to the output of the engine is below a predetermined level.

It is still another object of the present invention to provide an improved automatic power transmission control system which can be made in a relatively economical manner and is simple in construction.

It is a still another object of the present invention to provide a control system for an automatic power transmission of a motor vehicle having an engine and means producing a throttle pressure the magnitude of which is substantially proportional to the output of the engine, the transmission including a downshift passage into which a hydraulic fluid under variable pressure is introduced for continuously changing shifting points at which the transmission takes a downshift to the next lower speed gear ratio, the control system comprising: switch means; and downshift means for supplying a hydraulic fluid from a fluid apply to the downshift circuit to discontinuously move the shifting points toward the higher vehicle speed side so as to readily achieve downshift even during a relatively high speed cruising when once the switch means closes, and for stopping the hydraulic fluid supply to the downshift passage from the fluid supply to return the shifting points to their regularly set positions when the throttle pressure is increased to a predetermined level.

Other objects and advantages of the present invention will become more apparent from the detailed description when taken in conjunction with the accompanied drawings, in which:

FIG. 1 is a schematic circuit diagram of an automatic power transmission control system of the present invention.

Figure 2:
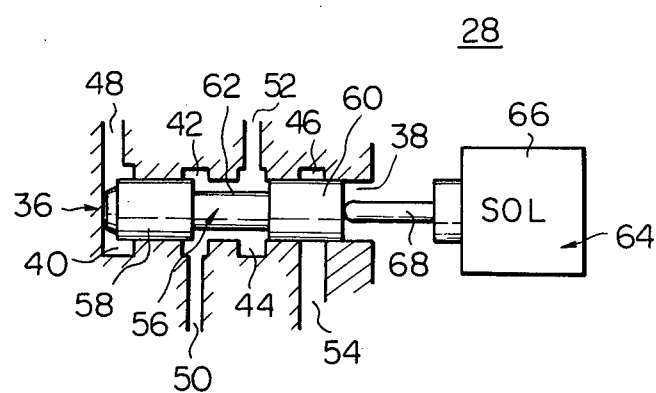
Figure 3:
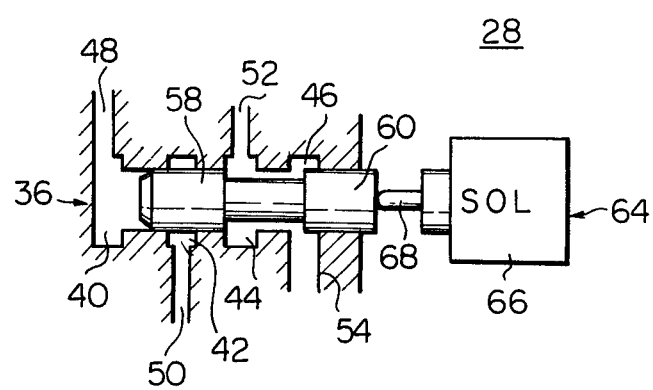
Figure 4:
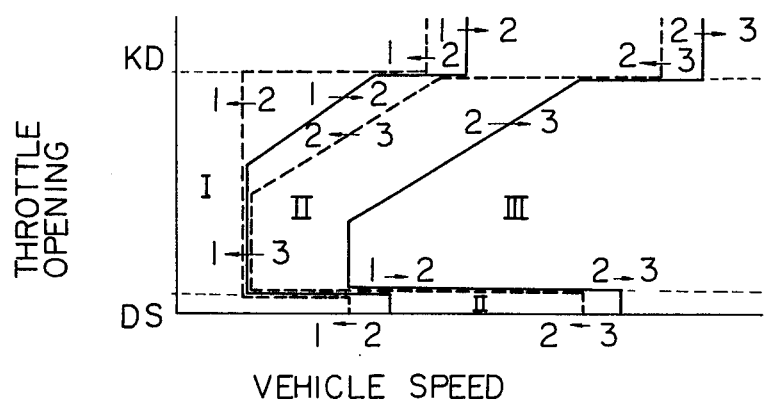

FIGS. 2 and 3 are schematic sectional views of a downshift valve employed in the control system of the invention, which views respectively show first and second positions of the downshift valve; and FIG. 4 is an illustration showing downshift and upshift characteristics of the automatic power transmission with the control system according to the present invention, the illustration being plotted of the throttle opening versus vehicle speed.

Referring to FIG. 1 of the drawings, an automatic power transmission control system 10 is shown as communicating with an internal combustion engine 12, an automatic power transmission proper 14 of known construction and a propeller shaft 16 drivingly connected to the transmission proper 14. Although not shown, the engine 12 has therein conventional means producing a throttle pressure the magnitude of which is substantially proportional to the output of the engine 12. Usually, the means communicates with a below-mentioned throttle valve (30) so as to produce the throttle pressure which is substantially proportional to the opening degree of the throttle valve. Thus, the throttle pressure is maximum when the throttle valve is fully open and minimum when the valve is only slightly open. The automatic power transmission proper 14 includes therein a conventional downshift passage (not shown) into which a hydraulic fluid under variable pressure is introduced for continually changing the points at which the transmission shift to the next lower speed gear ratio.

The control system 10 generally comprises a D.C. source 18, a kickdown switch 20 operated by an accelerator pedal 22, a downshift switch 24 operated by a brake pedal 26, and a downshift valve 28 connected to the transmission proper 14, the detailed construction of the downshift valve being shown in FIGS. 2 and 3. The kickdown switch 20 is disposed between the D.C. source 18 and the downshift valve 28 and closes for causing the energization of the downshift valve 28 when the accelerator pedal 22 is fully depressed to fully open the throttle valve 30. The downshift switch 24 is disposed between the D.C. source 18 and the downshift valve 28 through a diode 32 and closes when the brake pedal 26 is depressed. Indicated by the numeral 34 is brake lamp which lights up in response to the closing of the switch 24. As shown, the diode 32 is arranged to block current directed to the brake lamp 34 from the D.C. source 18 when the kickdown switch 20 closes and simultaneously, the downshift switch 24 is open. Thus, the closing of the kickdown switch 20 does not light up the brake lamp 34.

The detailed construction of the downshift valve 28 is illustrated in FIGS. 2 and 3, in which two positions of the downshift valve are respectively shown.

The downshift valve 28 comprises a valve body 36 formed with a chamber 38 including a first annular recess 40, a second annular recess 42, a third annular recess 44 and a fourth annular recess 46. The first and second annular recesses 40 and 42 respectively communicate with a throttle pressure passage 48 and a line pressure passage 50. To the throttle pressure passage 48 is applied the before-mentioned throttle pressure from the engine 12. The line pressure passage 50 is filled with a hydraulic fluid supplied from a conventional fluid supply (not shown). The third annular recess 44 is fluidly connected through a downshift passage 52 to the before-mentioned downshift passage having, for example, a 1-2 shift valve (not shown) and a 2-3 shift valve (not shown) which are operatively mounted on the transmission proper 14 in a conventional manner. Now, it should be noted that the connection of the third annular recess 44 with the downshift passage is so arranged that when some hydraulic fluid under pressure is introduced into the downshift passage, downshift shifting points at which the transmission proper 14 shift down to the next lower speed gear ratio range are discontinuously moved toward the higher vehicle speed side and are finally settled down at predetermined positions of the higher vehicle speed side. The fourth anuular recess 46 communicates with a fluid reservoir tank (not shown) through a drain passage 54.

Axially slidably received in the chamber 38 of the valve body 36 is a valve spool 56 which has spaced first and second lands 58 and 60 with an identical diameter, and an annular groove formed between the lands 58 and 60. The valve spool 56 has first and second positions. The first position is a position in which as shown well in FIG. 2, the first land 58 blocks the fluid communication between the first and second annular recesses 40 and 42 and simultaneously the second land 60 blocks the fluid communication between the third and fourth annular recesses 44 and 46. Furthermore the second and third annular recesses 42 and 44 fluidly communicate with each other. The second position is a position in which, as shown in FIG. 3, the first land 58 blocks not only the fluid communication between the first and second annular recesses 40 and 42 but also the fluid communication between the second and third annular recesses 42 and 44 and simultaneously the second land 60 opens the fluid communication between the third and fourth annular recesses 44 and 46. Thus, it should be noted that the only purpose of feeding the throttle pressure into the first recess 40 is for it to act on the end surface of the land 58, not to communicate with any other recesses. Adjacent the valve body 36 is located a solenoid device 64 which comprises a solenoid 66 with a coil having one end connected to both the above-mentioned kickdown switch 20 and the diode 32 and the other end grounded, and a plunger 68 which projects toward the second land 60 to move the valve spool 56 into the first position of FIG. 2 when the coil of the solenoid 66 is electrically energized. Now, it should be noted that, even when the solenoid 66 is deenergized, the valve spool 62 remains in the first position unless the throttle pressure in the first annular recess 40 exceeds a predetermined level. It should be also noted that the valve spool 56 remains in the first position when the coil of the solenoid 66 is energized and simultaneously the throttle pressure exceeds the predetermined level. This condition is induced as a result of closing the kickdown switch 20 in response to the full depression of the accelerator pedal 22.

With the above-stated construction of the control system 10 of the present invention, the operation is as follows.

When the vehicle driver wishes to decelerate during a relatively high speed cruising of the vehicle, with the aid of engine braking, he depresses the brake pedal 26 and thus the downshift switch 24 closes to provide an electrical connection between the D.C. source 18 and the coil of the solenoid 66 of the downshift valve 28. The plunger 68 is thus projected toward the valve spool 56 to move the valve spool into the first position with a result of a fluid communication formed between the second and third annular recesses 42 and 44, as shown in FIG. 2. Accordingly, the hydraulic fluid under predetermined pressure from the fluid supply is introduced through the passages 50 and 52 to the downshift passage to determine the shifting points at the predetermined positions at the higher vehicle speed side. Thus, the downshift operation of the transmission proper 14 is quickly achieved even during the relatively high speed cruising of the vehicle. As a result, engine braking is readily achieved.

Under the downshift operation of the transmission proper 14, when the vehicle driver normally depresses the accelerator pedal 24 to accelerate the vehicle, the throttle pressure in the first annular recess 40 is gradually increased and finally reaches the predetermined level at which the valve spool 56 is moved to the second position, as shown in FIG. 3. With the settling of the valve spool 56 in the second position, the fluid communication between the second and third annular recesses 42 and 44 is blocked by the first land 58, and the fluid communication between the third and fourth annular recesses 44 and 46 is completed to drain out the fluid remaining in the downshift passage. Thus, the transmission proper 14 takes again the beforeset gear ratio to carry regular shifting of the transmission proper 14.

Furthermore, if the driver wishes to accelerate the vehicle for passing a vehicle ahead at maximum speed, he depresses the accelerator pedal 22 to close the kickdown switch 20. The coil of the solenoid 66 is thus energized with a result that the downshifting of the transmission proper 14 is achieved in the same manner as described before. With this, the transmission proper 14 provides the propeller shaft 16 with increased torque, so that the maximum acceleration of the vehicle is achieved.

FIG. 4 shows upshift and downshift characteristics of the transmission proper 14 equipped with the control system of the present invention. First, second and third gear ratios of the transmission proper 14 are represented by the letters I, II and III. The solid lines represent respective shifting points in the case of the upshift, while the broken lines indicate the shifting points in the case of the downshift. The zone positioned above the line designated by KD is a zone in which the kickdown switch 20 closes causing the valve spool 56 of the downshift valve 28 to take the first position shown in FIG. 2. Within this zone, the shifting points take place at a higher vehicle speed. The other zone positioned below the line designated by DS is a zone in which the downshift switch 24 closes to allow the valve spool 56 to take the first position also. Also within this zone, the shifting points take place at the higher vehicle speed.

In order to clearly state the invention steps of the present invention, several characteristic operations of the transmission proper controlled by the system of the invention will be given as follows:

(1) When the brake pedal 26 remains released during the vehicle cruising, the regular shifting operations are conventionally obtained.

(2) In response to the depression of the brake pedal 26, the next lower speed gear ratio is quickly carried out so long as the vehicle speed is below the predetermined speed corresponding to the then-provided shifting point.

(3) The downshifting of the transmission proper will be continued even when the brake pedal is released. However, under this condition if the magnitude of the throttle pressure is increased to the predetermined level in response to the normal depression of the accelerator pedal, downshifting is discontinued and conversely, the regular shifting operation takes place.

With the above-stated construction of the subject invention, several effects and advantages arise as follows:

(1) The deceleration of the vehicle at a relatively high speed cruising can be made by the aid of engine braking by only temporary depression of the brake pedal 26.

(2) Since downshifting is continued even when the brake pedal is released, engine braking is more effectively and widely used. For example, under downhill cruising of the vehicle, the downshift operation is very useful.

(3) Since downshifting is completed only by the temporary depression of the brake pedal 26, the temporary brake depression can induce the start for the acceleration of the vehicle.

(4) Since the control system of the present invention can be constructed only by partially changing a part of a conventional one, it can be made in a relatively economical manner.

Although in the previous description, the control system of the subject invention has been shown to be applied to the three-forward-speed automatic power transmission, it is also possible to use the subject control system to other type automatic power transmissions, such as two-forward-speed and four-forward-speed transmissions.

The foregoing description shows only an exemplary embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A control system for an automatic power transmission of a motor vehicle having an engine and means producing a throttle pressure the magnitude of which is substantially proportional to the output of said engine, said transmission including a downshift circuit into which hydraulic fluid from a fluid supply under pressure is introducible for achieving downshift to the next lower vehicle speed gear ratio at relatively high vehicle speed, said control system comprising:
   switch means;
   a valve member including a valve body and a valve spool slidably held in said body, said valve spool taking first and second positions in said valve body, said first position being one in which said downshift circuit fluidly communicates with said fluid supply to be fed with said hydraulic fluid, said second position being a position in which said downshift circuit fluidly communicates with a drain passage for draining said hydraulic fluid therefrom;
   means for maintaining said valve spool of said valve means at said second position when the magnitude of said throttle pressure is higher than a predetermined level;
   a solenoid coil electrically connected to said switch means to be energized when said switch means closes; and
   a plunger cooperating with said solenoid coil so as to move said valve spool of said valve member into said first position even when the magnitude of said throttle pressure is higher than said predetermined level so long as said solenoid coil is energized in response to close condition of said switch means.

2. A control system as claimed in claim 1, in which said switch means comprises a first switch which is operatively connected to a brake pedal of said vehicle to close when said brake pedal is depressed.

3. A control system as claimed in claim 2, in which said switch means further comprises a second switch which is operatively connected to an accelerator pedal of said vehicle to close when said accelerator pedal is depressed to its full extent.

4. A control system as claimed in claim 3, in which said first and second switches are arranged parallel to each other.

5. A control system for an automatic power transmission of a motor vehicle having an engine and means producing a throttle pressure the magnitude of which is substantially proportional to the output of said engine, said transmission including a downshift circuit into which a hydraulic fluid from a fluid supply under pressure is introducible for achieving downshift to the next lower vehicle speed gear ratio at relatively high vehicle speed, said control system comprising:
   switch means;
   a valve body formed with a chamber including first, second, third and fourth annular recesses which fluidly communicate with a throttle pressure passage to which said throttle pressure is supplied, a line pressure passage to which said hydraulic fluid from said fluid supply is supplied, a downshift passage leading to said downshift circuit, and a drain passage, respectively;
   a valve spool axially slidably received in said chamber of said valve body and having thereon spaced first and second lands, said valve spool taking first and second positions in said chamber, said first position being a position in which said first land blocks the fluid communication between said first and second annular recesses and said second land blocks the fluid communication between said third and fourth annular recesses and further said second and third annular recesses fluidly communicate with each other, said second position being a position in which said first land blocks not only the fluid communication between said first and second annular recesses but also the fluid communication between said second and third annular recesses and said second land opens the fluid communication between said third and fourth annular recesses;
   a solenoid coil electrically connected through said switch means to an electrical power source to be energized when said switch means closes; and a plunger cooperated with said solenoid coil to move said valve spool of said valve member into said first position when said solenoid coil is energized in response to the closed condition of said switch means.

6. A control system as claimed in claim 5, in which the mutual relationship between said valve body and said valve spool is so made that said valve spool remains in said first position thereof when said solenoid coil is de-energized so long as the magnitude of said throttle pressure in said first annular recess is below said predetermined level.

7. A control system as claimed in claim 5, in which the mutual relationship between said valve body and said valve spool is so made that said valve spool remains in said first position when said solenoid coil is energized and simultaneously the magnitude of said throttle pressure in said first annular recess is above said predetermined level.

8. A control system for an automatic power transmission of a motor vehicle having an engine and means producing a throttle pressure the magnitude of which is substantially proportional to the output of said engine, said transmission including a downshift circuit into which a hydraulic fluid from a fluid supply under pressure is introducible for achieving downshift to the next lower vehicle speed gear ratio at relatively high vehicle speed, said control system comprising:

switch means; and downshift means for supplying the hydraulic fluid from said fluid supply to said downshift circuit to discontinuously move shifting points at which said transmission shifts down to the next lower speed gear ratio toward the higher vehicle speed side when said switch means once closes, and for stopping the hydraulic fluid supply to said downshift circuit from said fluid supply to return said shifting points to their regularly set positions when said throttle pressure is increased to a predetermined level and said switch means opens;

said downshift means having first and second positions, said first position being a position wherein said downshift circuit fluidly communicates with said fluid supply and fed with said hydraulic fluid, said second position being a position in which said downshift circuit is blocked from said fluid supply, and valve member control means for causing said valve member to take said first position when electrically energized in response to the closed condition of said switch means and to take said second position when the throttle pressure is increased to said predetermined level;

said valve member comprising a valve body formed with a chamber including first, second, third and fourth annular recesses which fluidly communicate with a throttle pressure passage to which said throttle pressure is supplied, a line pressure passage to which the hydraulic fluid from said fluid supply is supplied, a downshift passage leading to said downshift circuit, and a drain passage, respectively, and a valve spool axially slidably held in said chamber of said valve body and having thereon spaced first and second lands, said valve spool taking first and second positions in said chamber, said first position being a position in which said first land blocks the fluid communication between said first and second annular recesses and said second land blocks the fluid communication between said third and fourth annular recesses and further in which said second and third annular recesses fluidly communicate with each other, said second position being a position in which said first land blocks not only the fluid communication between said first and second annular recesses but also the fluid communication between said second and third annular recesses and said second land opens the fluid communication between said third and fourth annular recesses;

said valve control means comprising a solenoid coil electrically connected through said switch means to an electrical power source to be energized when said switch means closes, and a plunger cooperating with said solenoid to move said valve spool of said valve member into said first position when said solenoid coil is energized in response to the closed condition of said switch means.

* * * * *